US012671705B2

(12) United States Patent
Rajarathnam et al.

(10) Patent No.: US 12,671,705 B2
(45) Date of Patent: Jun. 30, 2026

(54) SELECTING POLICIES TO APPLY TO NETWORK TRAFFIC FLOWS BASED ON PERCEPTION SCORES

(71) Applicant: HEWLETT PACKARD ENTERPRISE DEVELOPMENT LP, Spring, TX (US)

(72) Inventors: Nirmal Rajarathnam, Santa Clara, CA (US); Navaneethan Venugopal, Sunnyvale, CA (US); Bhagvan Cheeyandira, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 570 days.

(21) Appl. No.: 18/308,857

(22) Filed: Apr. 28, 2023

(65) Prior Publication Data

US 2024/0364722 A1 Oct. 31, 2024

(51) Int. Cl.
*H04L 9/40* (2022.01)

(52) U.S. Cl.
CPC ........ *H04L 63/1425* (2013.01); *H04L 63/145* (2013.01); *H04L 63/20* (2013.01)

(58) Field of Classification Search
CPC .... H04L 63/1425; H04L 63/145; H04L 63/20
See application file for complete search history.

(56) References Cited

U.S. PATENT DOCUMENTS

| | | | |
|---|---|---|---|
| 8,448,234 B2 | 5/2013 | Mondaeev et al. | |
| 10,003,607 B1 * | 6/2018 | Kolman | H04L 63/1408 |
| 10,135,843 B2 * | 11/2018 | Ardeli | H04L 63/101 |
| 10,212,176 B2 * | 2/2019 | Wang | H04L 63/1425 |

(Continued)

FOREIGN PATENT DOCUMENTS

| | | |
|---|---|---|
| EP | 1636704 A2 | 3/2006 |
| WO | 2004111785 A2 | 12/2004 |

OTHER PUBLICATIONS

Kim, Yoohwan, et al. "PacketScore: a statistics-based packet filtering scheme against distributed denial-of-service attacks." IEEE transactions on dependable and secure computing 3.2 (2006): 141-155. (Year: 2006).*

(Continued)

*Primary Examiner* — Jung W Kim
*Assistant Examiner* — Sameera Wickramasuriya
(74) *Attorney, Agent, or Firm* — Trop, Pruner & Hu, P.C.

(57) ABSTRACT

A process includes prioritizing candidate network traffic flow profiles. The prioritization includes associating perception scores with respective candidate network traffic flow profiles. Each candidate network traffic flow profile is a member of a profile group of a plurality of profile groups. The process includes associating weights with respective profile groups of the plurality of categories. The process includes, responsive to a network traffic flow, identifying, by a traffic analysis engine, a first observed profile of the network traffic flow corresponding to a first candidate network traffic flow profile. The process includes, based on the perception score associated the first candidate network traffic flow profile and the weight associated with the profile group in which the first candidate network traffic flow profile is a member, determining a policy score; and selecting, by the network analysis engine, a policy to be applied to the network traffic flow based on the policy score.

18 Claims, 6 Drawing Sheets

(56)          References Cited

U.S. PATENT DOCUMENTS

| | | | | |
|---|---|---|---|---|
| 10,686,805 | B2 * | 6/2020 | Reybok, Jr. | H04L 63/1416 |
| 10,986,106 | B2 * | 4/2021 | Muddu | H04L 43/20 |
| 11,178,068 | B1 * | 11/2021 | Etler | H04L 47/826 |
| 11,200,324 | B1 * | 12/2021 | Manral | G06F 21/629 |
| 11,212,223 | B2 * | 12/2021 | Gupta | H04L 45/302 |
| 11,368,470 | B2 * | 6/2022 | Liu | H04L 67/61 |
| 12,166,795 | B2 * | 12/2024 | Boyle | H04L 63/1483 |
| 2005/0015624 | A1 | 1/2005 | Ginter et al. | |
| 2007/0226803 | A1 * | 9/2007 | Kim | G06F 21/564 |
| | | | | 713/188 |
| 2008/0201772 | A1 | 8/2008 | Mondaeev et al. | |
| 2016/0359917 | A1 * | 12/2016 | Rao | G06F 16/29 |
| 2019/0081976 | A1 * | 3/2019 | Kraft | G06F 21/44 |
| 2019/0238582 | A1 * | 8/2019 | Sauve | H04L 63/1433 |
| 2020/0021609 | A1 * | 1/2020 | Kuppanna | H04L 63/0227 |
| 2021/0352151 | A1 * | 11/2021 | Gupta | H04L 67/148 |
| 2022/0007195 | A1 * | 1/2022 | Shaw | H04L 63/104 |
| 2024/0098108 | A1 * | 3/2024 | Limb | H04L 63/1425 |

OTHER PUBLICATIONS

Das, Sanjiv Ranjan. "Matrix metrics: Network-based systemic risk scoring." The Journal of Alternative Investments 18.4 (2016): 33-51. (Year: 2016).*

Aruba, "Unified Threat Management for Modern Networks", available online at <https://www.arubanetworks.com/products/security/unified threat-management/>, 2023, 3 pages.

Palko, Dmitry, et al.; "Model of Information Security Critical Incident Risk Assessment"; 2020 IEEE International Conference on Problems of Infocommunications; pp. 157-161.

"Unified Policy and Management for the Distributed Enterprise" Hewlett Packard Enterprise Development (2022); https://www.arubanetworks.com/assets/tg/TD_Unified-Policy-Management.pdf; downloaded on Apr. 28, 2023; 11 pp.

"ET Pro Ruleset"; Proofpoint; https://www.proofpoint.com/us/threat-insight/et-pro-ruleset; downloaded on Apr. 28, 2023; 5 pp.

"Validated Solution Guide"; Hewlett Packard Enterprise; https://www.arubanetworks.com/techdocs/VSG/docs/070-sd-branch-design/Media/PDF/Aruba_VSG_SD-Branch-Design.pdf; Apr. 21, 2023; downloaded on Apr. 28, 2023; 110 pp.

* cited by examiner

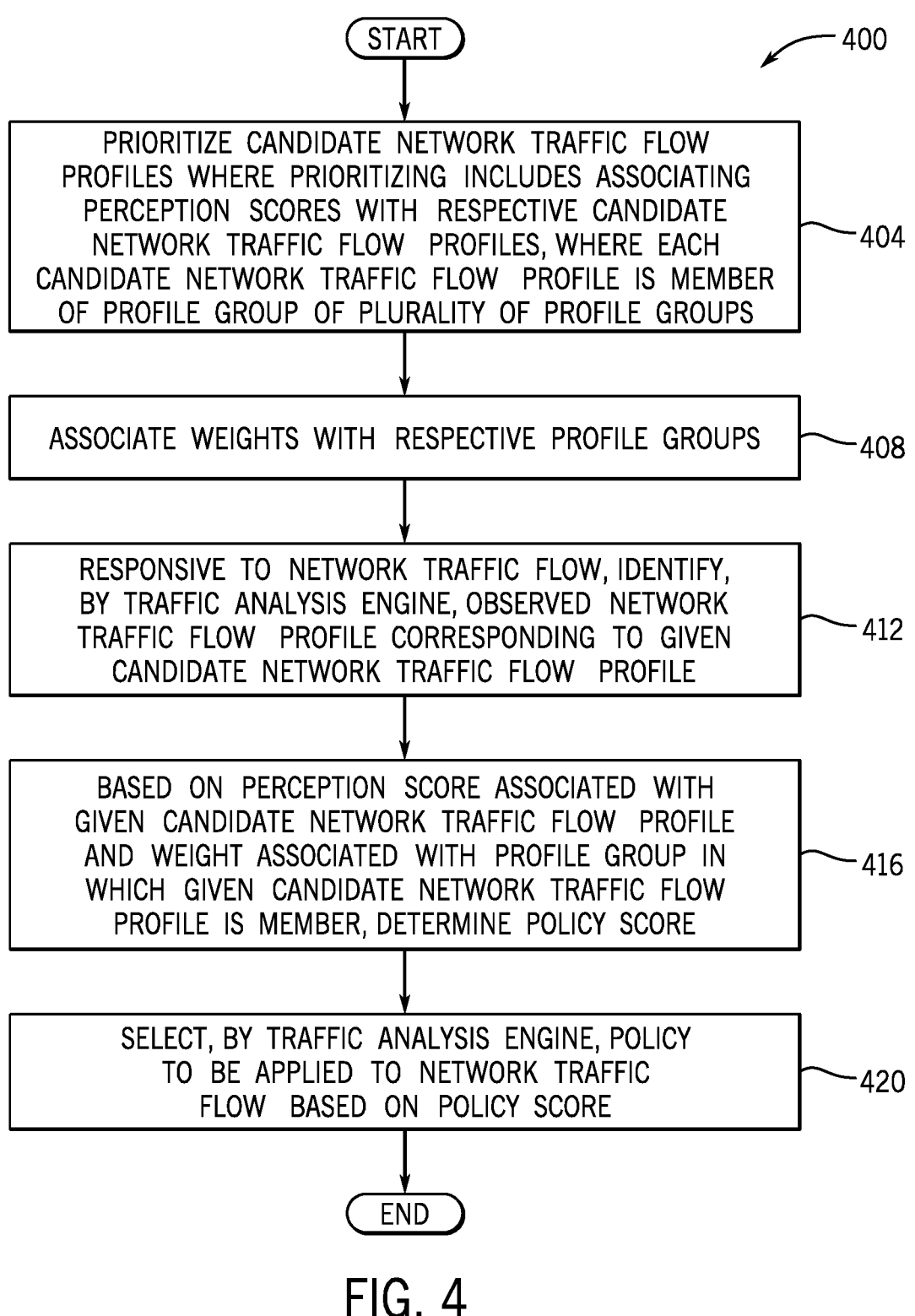

START

400

PRIORITIZE CANDIDATE NETWORK TRAFFIC FLOW PROFILES WHERE PRIORITIZING INCLUDES ASSOCIATING PERCEPTION SCORES WITH RESPECTIVE CANDIDATE NETWORK TRAFFIC FLOW PROFILES, WHERE EACH CANDIDATE NETWORK TRAFFIC FLOW PROFILE IS MEMBER OF PROFILE GROUP OF PLURALITY OF PROFILE GROUPS

404

ASSOCIATE WEIGHTS WITH RESPECTIVE PROFILE GROUPS

408

RESPONSIVE TO NETWORK TRAFFIC FLOW, IDENTIFY, BY TRAFFIC ANALYSIS ENGINE, OBSERVED NETWORK TRAFFIC FLOW PROFILE CORRESPONDING TO GIVEN CANDIDATE NETWORK TRAFFIC FLOW PROFILE

412

BASED ON PERCEPTION SCORE ASSOCIATED WITH GIVEN CANDIDATE NETWORK TRAFFIC FLOW PROFILE AND WEIGHT ASSOCIATED WITH PROFILE GROUP IN WHICH GIVEN CANDIDATE NETWORK TRAFFIC FLOW PROFILE IS MEMBER, DETERMINE POLICY SCORE

416

SELECT, BY TRAFFIC ANALYSIS ENGINE, POLICY TO BE APPLIED TO NETWORK TRAFFIC FLOW BASED ON POLICY SCORE

420

END

Figure 6:
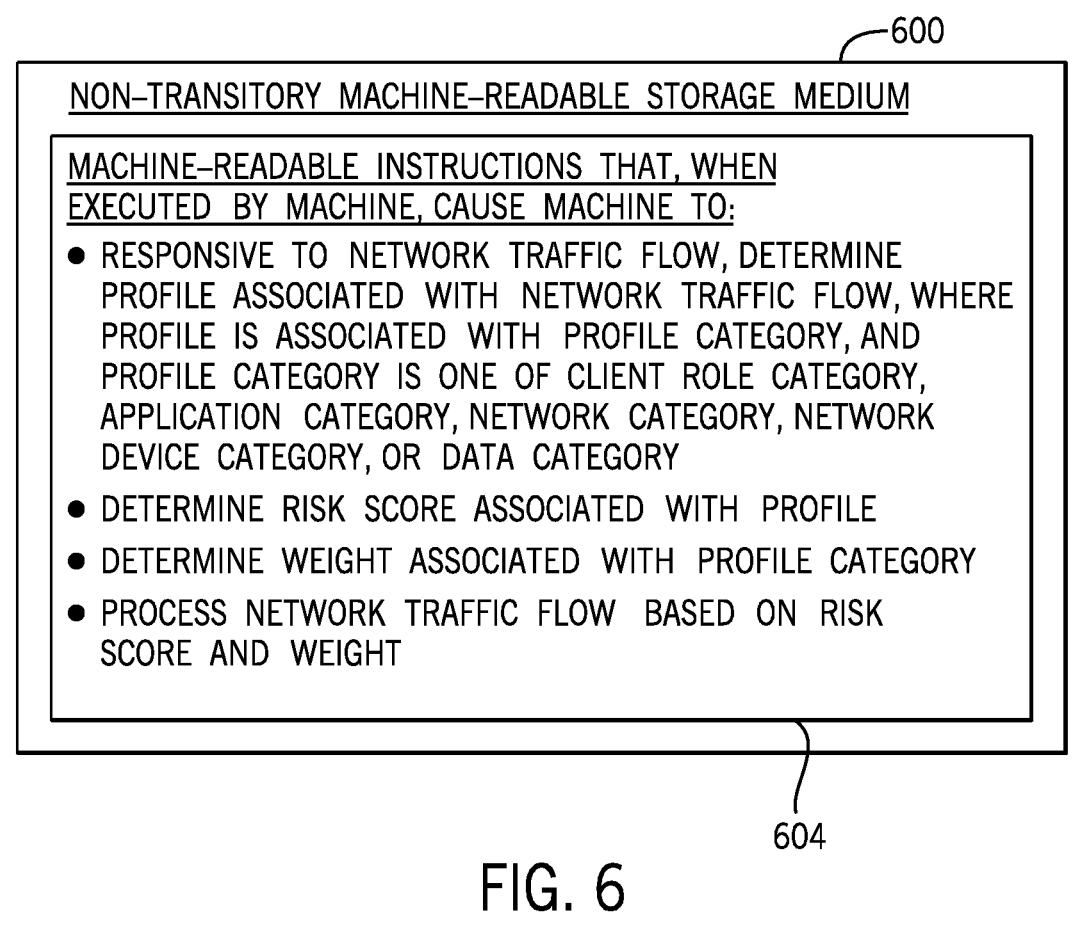

NON—TRANSITORY MACHINE—READABLE STORAGE MEDIUM

MACHINE—READABLE INSTRUCTIONS THAT, WHEN
EXECUTED BY MACHINE, CAUSE MACHINE TO:

- RESPONSIVE TO NETWORK TRAFFIC FLOW, DETERMINE
  PROFILE ASSOCIATED WITH NETWORK TRAFFIC FLOW, WHERE
  PROFILE IS ASSOCIATED WITH PROFILE CATEGORY, AND
  PROFILE CATEGORY IS ONE OF CLIENT ROLE CATEGORY,
  APPLICATION CATEGORY, NETWORK CATEGORY, NETWORK
  DEVICE CATEGORY, OR DATA CATEGORY

- DETERMINE RISK SCORE ASSOCIATED WITH PROFILE

- DETERMINE WEIGHT ASSOCIATED WITH PROFILE CATEGORY

- PROCESS NETWORK TRAFFIC FLOW BASED ON RISK
  SCORE AND WEIGHT

SELECTING POLICIES TO APPLY TO NETWORK TRAFFIC FLOWS BASED ON PERCEPTION SCORES

BACKGROUND

A computer system may be subject to a security attack in which an attacker seeks to access information that is stored on the computer system or harm components of the computer system. A computer system may have a wide variety of mechanisms to detect and prevent security attacks, and some of these mechanisms may reside at the network level.

BRIEF DESCRIPTION OF THE DRAWINGS

FIG. 4 is a flow diagram depicting a process to select a policy to apply to a network traffic flow based on a perception score derived from an observed network traffic flow profile and a weight associated with a category of the profile according to an example implementation.

FIG. 6 is an illustration of machine-readable instructions that are stored on a machine-readable storage medium, which, when executed by a machine, cause the machine to process a network traffic flow based on a risk score associated with a profile associated with the network traffic flow and a weight associated with a profile category according to an example implementation.

DETAILED DESCRIPTION

Figure 1:
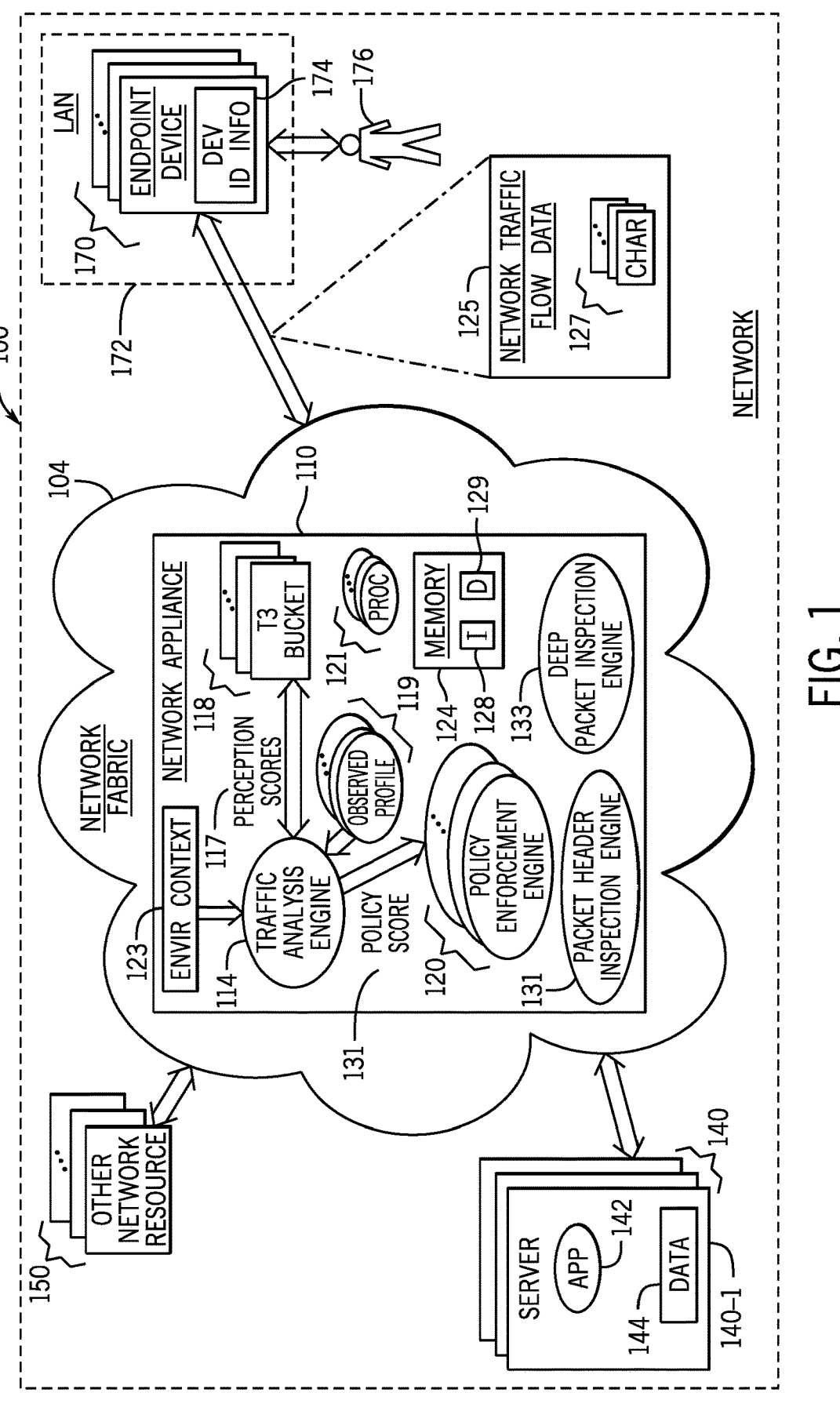
FIG. 1 is a block diagram of a network having a network appliance with a traffic analysis engine that selects policies to apply to network traffic flows based on perception based-policy scores according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology that is used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

An enterprise network may include an infrastructure that manages wide area network (WAN) connectivity for edge devices. The edge devices may be part of a local area network (LAN) branch of the enterprise network. Here, an "edge device" refers to a network device that provides an entry point to a network, such as an entry point to the enterprise network. As examples, an edge device may be an Internet of Things (IoT) device, an access point, a network switch, a mobile device, a router, a portable computer, a laptop device, a wearable device, or an integrated access device (IAD). The infrastructure's management of WAN connectivity may include managing various WAN policies, such as routing and network security policies. A WAN may have a number of different architectures. In an example, a WAN may be a collection of LANs. The Internet is another example of a WAN.

Edge devices are being ever-increasingly used to access Internet resources. For example, cloud providers provide a wide variety of Software-as-a-Service (SaaS) services, which may be accessed by edge devices. One approach to managing network security includes controlling edge device access based on a user identification (ID) and/or a client ID that is associated with the edge device. For example, the edge device's scope of access may be constrained to access privileges that are associated with a role that is associated with the user ID or client device ID. Security threats to an enterprise network, however, may not be detectable solely based on user IDs and client IDs. For example, a malevolent agent may be present on an authorized user's edge device. As other examples, an authorized edge device may access a malevolent web site, an application or network. The varieties of user roles, client devices, applications, network devices and data are ever-increasing at LAN branches, thereby providing an ever-increasing number of potential security attack vectors.

In accordance with example implementations that are described herein, a network appliance, such as a network appliance that manages WAN connectivity for edges of a LAN branch, characterizes network traffic flows based on monitored, or observed, profiles of the network traffic flows. The network appliance may select a particular traffic handling policy (e.g., a particular security policy, a particular routing policy, a particular application throughput policy, a quality of experience policy, or other decision-making policy) for a network traffic flow based on the appliance's characterization of the flow.

More specifically, in accordance with example implementations, the network appliance is constructed to associate the observed profiles with perceptions (e.g., preconceived security threat risks) of the observed profiles. In this context, a "perception" of a particular observed profile refers to a subjective, preconceived characterization of the observed profile, which is independent from the observed profile's affiliation with a particular network traffic flow. As further described herein, the network appliance prioritizes and combines the perceptions to form a characterization of the network traffic flow that is quantified in the form of a policy score (e.g., an integer or real number in a certain range, such as a range of 0 to 10). The policy score is therefore generated based on subjective criteria (e.g., the perception scores) and objective criteria (the weighting of the perception scores and the summation of the weighted perception scores). The policy score may be viewed as being a network traffic flow intent indicator, which may serve as a guide for the network appliance for purposes of the network appliance selecting the appropriate policy to apply to the network traffic flow. As an example, a network appliance may generate the policy score to assess a security threat risk that is posed by a particular network traffic flow for purposes of determining the type or types of packet inspection to be applied to the network traffic flow. A larger value policy score may, for example, represent that packets of the network traffic flow should be subjected to a more stringent inspection policy, as compared a more moderate or lenient inspection policy for a smaller value policy score.

In the context used herein, a "profile" is a characterization of a particular aspect or feature associated with a network traffic flow. In accordance with example implementations, the network appliance is constructed to recognize profiles that are contained in a finite set of profiles that are called "candidate profiles" herein. A particular network traffic flow may be associated with one or multiple observed profiles that correspond to one or multiple candidate profiles. As used herein, an "observed profile" refers to a profile that is observed by the network appliance as being associated with a particular network traffic flow. As described further herein, the network appliance may determine that a particular profile is associated with a network traffic flow (and therefore is an "observed" profile) based on one or multiple characteristics that are associated with the network traffic flow. In an example, a characteristic that is associated with a network traffic flow may be a characteristic corresponding to inline data (packet header data and/or packet payload data) of the network traffic flow, such as an application ID contained in a packet or an Internet Protocol (IP) address of a packet header. In another example, a characteristic that is associated with a network traffic flow may correspond to data outside of the network traffic flow, such as, for example, data that represents a user ID associated with the network traffic flow.

The approach that is described herein for generating a policy score based on characteristics of a network traffic flow balances certain goals (e.g., promoting network security or application delivery throughput) against overburdening the network appliance and/or network traffic flow. In the context that is used herein, a "network traffic flow" generally refers to a communication of data in a data plane of a communication infrastructure. The network traffic flow may take on one of many different forms. In an example, a network traffic flow may be a communication of packets that contain user data and application data. In an example, a network traffic flow may be unidirectional from a source network device to a destination network device. In another example, a network traffic flow may be bidirectional between two network devices. In an example, a network traffic flow may be associated with a session, where a "session" refers to an exchange of data between network devices. In another example, a network traffic flow may not be associated with a session, such as, for example, a network traffic flow that is associated with a multicast broadcast. In an example, a network traffic flow may be associated with a protocol (e.g., Transport Control Protocol (TCP)/IP) that relies on connections between two network endpoint devices. In another example, a network traffic flow may be associated with a User Datagram Protocol (UDP) that is connectionless.

As described above, the policy score may serve as a guide for selecting a network security-related decision-making policy, such as the type or types of packet inspection to be used for purposes of evaluating a security threat of the network traffic flow. In this manner, the policy score may represent a security threat risk associated with the network traffic flow. The policy score may, in accordance with further implementations, serve as a guide for selecting a policy other than a packet inspection policy, and in accordance with yet further example implementations, the policy score may serve as a guide for selecting a policy unrelated to network security. In an example, the policy score may serve as a guide for the selection of a particular policy to promote application throughput. In an example, a given perception may be an assumed strength of an observed profile as an indicator (due to the presence of the observed profile) that the application throughput (e.g., a relatively low latency and a relatively high bandwidth) is important for the network traffic flow. For example, application throughput may be a priority for network traffic flows that are associated with particular departments of an enterprise or networks (e.g., guest networks) of the enterprise, and the policy score may be used to identify such traffic flows so that the appropriate policies (e.g., routing policies, inspection policies, quality of service policies, or other decision-making policies) may be selected. For this example, the policy score represents whether an application throughput is intended to be of importance for the network traffic flow.

In accordance with example implementations, the network appliance associates a perception with an observed profile and quantifies the perception using what is referred to herein as a perception score (e.g., a number, such as an integer or real number). Stated differently, the network appliance associates, or assigns, a perception score to the observed profile. More specifically, in accordance with some implementations, as part of the configuration of the network appliance, a system administrator or other authorized user may specify a set of candidate profiles and assign perception scores to the respective candidate profiles. The candidate profiles, in accordance with example implementations, define the entire set of profiles that may possibly be observed by the network appliance. The network appliance, for a given network traffic flow, identifies one or multiple observed profiles with the given network traffic flow, identifies the corresponding candidate profile(s), and assigns the perception score(s) that are associated with the candidate profile(s) to the observed profile(s).

In accordance with example implementations, the policy score is a holistic score that is formed from a weighted combination of the perception scores. The weighting prioritizes the perception scores so that a given perception scores may have more or less influence on the policy score than another weighted perception score. Moreover, the weighting provides an objective component to the policy score, whereas the perception scores provide a subjective component to the policy score.

The weight that is applied to a particular perception score may depend on the particular classification, or category (called "a profile category" herein), to which the associated profile belongs. In an example, the set of candidate profiles may include client role profiles that are members of a client role profile category. A client role profile refers to a named collection of access privileges, which may be assigned to a client. In this context, a "client" refers to an entity associated with a client device (e.g., an edge device), and may refer to one or multiple characteristics (e.g., a client device ID) of the client device and/or one or multiple characteristics of the user (e.g., a user ID) that is affiliated with the client device. As an example, a client role profile may be may be affiliated with a particular user role, such as a job title or a specific responsibility (e.g., a system administrator or a chief technology officer (CTO)). In another example, a client role profile may be affiliated with a particular business group (e.g., a particular research and development (R&D) group, a particular marketing group or a human resources (HR) department). In another example, a client role profile may be used to distinguish a non-employee (e.g., a guest) of a business enterprise from other employee-related roles. In another example, a client role profile may be a class of devices (e.g., smartphones) associated with a particular user role (e.g., guest). In another example, a particular client role profile may be "other." In an example, the network appliance may characterize a network traffic flow as being associated with a particular client role profile based on a user ID. As an example, the user ID may be login ID that is furnished by a user to request access to an application or request access to a network.

In another example, the set of candidate profiles may include network profiles that are members of a network profile category. A network profile characterizes a particular network (e.g., characterizes a particular LAN or WAN). As examples, a network profile may characterize a network as being trusted, unknown, secure, unsecure, restricted, unrestricted, private, public, malevolent, benign, a guest access fabric, or as having another property. In an example, the network appliance may characterize a network traffic flow as being associated with a particular network profile based on a destination IP address that is contained in a packet header of the network traffic flow. In another example, the network appliance may characterize a network traffic flow as being associated with a particular network profile based on a source IP address that is contained in a packet header of the network traffic flow.

In another example, the set of candidate profiles may include data profiles that are members of a data profile category. As examples, a data profile may characterize a network traffic flow as being associated with data that is confidential, restricted, public, highly confidential, unknown, sensitive or data that has another property. In an example, the network appliance may perform a deep packet inspection of one or multiple packets of the network traffic flow to examine data of the network traffic flow. Here, a "deep packet inspection" refers to an examination of data of a packet other than the data that is contained in the packet's header. Based on one or multiple characteristics (e.g., documents have copyright designations, confidential labels, organizational labels, department labels, certain keywords or other indicators of data type) of a given network traffic flow, the network appliance may determine, for example, that a particular network traffic flow is associated with a particular type, or category (e.g., confidential data), of data.

In another example, the set of candidate profiles may include network device profiles that are members of a network device profile category. As examples, network device profiles may characterize a network traffic flow as being associated with such network devices as an IoT device, a camera, a server, a client, a wired device, a portable computer, an unknown device, or a device of another device, or a device belonging to another device category. In an example, the network appliance may associate a network traffic flow with a particular network device profile based on a network device ID. As examples, the network device ID may be provided by a network access point (e.g., a wired or wireless access point). The network device ID may be, as examples, a Media Access Control (MAC) address or another device identifier.

In another example, the set of candidate profiles may include application profiles that are members of an application profile category. As examples, application profiles may characterize a network traffic flow as being associated with a social media application, a database application, a private network enterprise server-provided application, a cloud server-provided application, a browser application, a video content application, an online commerce application, an unknown application, a malevolent application, or an application affiliated with another application category. In an example, the network appliance may perform a deep packet inspection of the network traffic flow to acquire an application ID and associate the application ID with a particular application profile.

In accordance with example implementations, the network appliance associates different weights with the profile categories to establish a particular environment context for the profile score. The environment context accommodates the wide variety of environments in which the network appliance may be deployed and the criteria used to assess intent (as reflected by the policy score). In an example, the network appliance may determine a security threat risk score (a policy score) for an environment in which the network profile is considered to be the primary indicator of whether a network traffic flow is intended to be part of a security attack. For this environment, an environment context may be used that prioritizes the network profile over profiles that are associated with other profile categories. In an example, the network appliance may associate the network profile category (and therefore, weight observed profiles associated with the network profile category) raised with the highest weight (e.g., a weight of "9") and associate other profile categories with lower weights (e.g., associate the application profile category with a weight of "5," associate the client role profile category with a weight of "4" and so forth). Therefore, when determining the profile score, the network appliance weights the perception scores according to the associated profile categories. In an example, for the specific weight example above, when a network profile is observed for a network traffic flow, the network appliance may assign a weight of "9" to the perception score for the observed network profile. As another example, for the specific weight example above, when an application profile is observed for a network traffic flow, the network appliance may assign a weight of "5" to the perception score for the observed application profile.

In another example, the network appliance may determine a security threat risk score (a policy score) for an environment in which the application profile is considered to be the primary indicator of whether a network traffic flow is intended to be associated with a security attack. For this environment, an environment context may be used that prioritizes an observed application profile over observed profiles that are associated with other profile categories. In an example, for this environment context, the network appliance may associate the application profile category with the highest weight (e.g., a weight of "9") and associate other profile categories with lower weights (e.g., associate the client role profile category with a weight of "4," associate the network profile category with a weight of "2" and so forth).

In another example, the network appliance may determine a security threat risk score (a policy score) for an environment in which the client role profile is considered to be the primary indicator of whether a network traffic flow is intended to be associated with a security attack. For this environment, an environment context may be used that prioritizes an observed client role profile over observed profiles that are associated with other profile categories. In an example, for the client role environmental context, the network appliance may associate the client role profile category with the highest weight (e.g., a weight of "9") and associate other profile categories with lower weights (e.g., associate the application profile category with a weight of "5," associate the network profile category with a weight of "2" and so forth).

In another example, the network appliance may determine an application throughput score (a policy score) for an environment in which the application profile is considered to be the primary indicator of whether a network traffic flow is intended to have a high throughput (e.g., relatively low latency and relatively high bandwidth) for application delivery. In an example, for this environment context, the network appliance may prioritize an observed client role profile over other observed profiles that are associated with other profile categories. In an example, the network appliance may associate the client role profile category with the highest weight (e.g., a weight of "9") and associate other profile categories with lower weights (e.g., associate the application profile category with a weight of "5," associate the network profile category with a weight of "2" and so forth).

In accordance with example implementations, for a given network traffic flow, the network appliance may determine multiple policy scores for multiple corresponding environment contexts. In an example, the network appliance may activate a particular environment context (and correspondingly, deactivate other environment context(s)) to calculate a security risk score for a network traffic flow and then activate another environment context (and correspondingly deactivate the other environment context(s)) to calculate an application throughput score for the same network traffic flow. In another example, the network appliance may, for the same network traffic flow, calculate multiple policy scores (corresponding to different environmental contexts) in parallel.

As described herein, the candidate profiles may be classified, or grouped, according to their respective profile categories. In accordance with example implementations, the network appliance may further group candidate profiles according to their associated perception scores. More specifically, in accordance with example implementations, candidate profiles that share the same perception score in common are members of the same group. This group is referred to herein as a traffic treatment type (or "T3") group, or "T3 bucket." In an example, a particular T3 bucket may be associated with a perception score of "3," such that the candidate profiles that are contained in the T3 bucket each have an associated perception score of "3." In another example, another T3 bucket may be associated with a perception score of "6", such that the candidate profiles that are contained in this T3 bucket each have an associated perception score of "6."

An authorized user (e.g., a system administrator) may configure the network appliance to create a configurable number of T3 buckets, associate each T3bucket with a configurable perception score and populate the T3 buckets with candidate profiles. For example, for network security, the perception scores may be security threat risk perception scores. In a more specific example, one T3 bucket may be associated with a security threat risk perception score of "9" (e.g., a score corresponding to a relatively high perceived security risk), and this T3 bucket may contain one or multiple client role profile(s), application profile(s), data profiles, network profile(s) and/or network device profile(s)) that are considered to be associated with relatively high perceived security threat risks. As another example, for network security, another T3 bucket may be associated with a security threat risk score of "1" (e.g., a score corresponding to a relatively low perceived security risk), and this T3 bucket may contain certain profiles that are associated with a relatively low perceived security threat risks.

The network appliance may use the T3 buckets to derive a policy score for a given network traffic flow as follows, in accordance with example implementations. The network appliance first determines characteristics associated with the network traffic flow. These characteristics may include one or multiple characteristics that are observed directly from the network traffic flow. For example, the characteristics may include destination IP address that is represented by data in a packet header or an application ID that is represented by data that is part of the packet payload. The characteristics may include one or multiple characteristics that are indirectly associated with the traffic flow. For example, the characteristics may include a user ID that provided by a network access point or other device. From the characteristics associated with the network traffic flow, the network appliance may then identify, or determine one or multiple observed profiles associated with the network traffic flow. Each observed profile, in accordance with example implementations, corresponds to a particular candidate profile.

The network appliance may then identify the T3 bucket(s) that contain the candidate profiles that correspond to the observed profiles, which allows the network appliance may to determine associated perception scores for the observed profiles. The network appliance may then weight the perception scores according to the appropriate environment context and combine (e.g., sum) the weighted perception scores together to derive a policy score for the network traffic flow. The network appliance may then, as further described herein, select the appropriate policy to apply to the network traffic flow based on the policy score.

In accordance with some implementations, the policy score may be a value that falls within a particular range (e.g., a range of real numbers between zero and one), and the network appliance may subdivide the range into sub-ranges, or zones, that are respectively associated with network traffic policies. For example, for purposes of determining which type of packet inspection to apply, the range for a particular policy score may span from zero to one. For this example, 0.4 and 0.7 may demarcate zone boundaries to form three zones. Continuing this example, a policy score less than 0.4 may mean that a lenient packet inspection policy is applied; a policy score more than 0.7 may mean that a strict packet inspection policy is applied; and a policy score greater than or equal to 0.4 and less than or equal to 0.7 may mean that an intermediate packet inspection policy is applied.

In an example, the strict packet inspection policy may specify that secure socket layer (SSL) inspection, anti-malware inspection and data loss prevention (DLP) inspection are to be applied to the packets of the network traffic flow. In an example, the moderate packet inspection policy may specify that SSL inspection and anti-malware inspection are to be applied to the packets of the network traffic flow, but further specify that DLP inspection is not to be applied. In another example, the lenient packet inspection policy may specify that SSL inspection is to be applied to the packets of the network traffic flow but further specify that neither anti-malware inspection nor DLP inspection is to be applied. As a further example, a policy score range may be divided into more than three or less than three zones. As another example, the policy score range may be subdivided into four zones, and the policy corresponding to a policy score in the lowest value zone may be one which no packet inspection occurs.

Referring to FIG. 1, as a more specific example, in accordance with some implementations, a network 100 includes one or multiple network endpoint devices 170. As another example, in accordance with some implementations, the endpoint devices 170 may be edge devices that are part of a branch LAN 172. A particular endpoint device 170 may be associated with one or multiple users 176 and may contain device-identifying information 174. Moreover, the endpoint devices 170 may communicate with servers 140 as well as other network resources 150 (other network devices, storage devices, appliances, and so forth) via network fabric 104. For example implementations that are described herein, a given endpoint device 170 may access an application 142 served by a particular server 140-1 and/or access data 144 served by the server 140-1.

In accordance with example implementations, an endpoint device 170 may be a computer platform. A "computer platform," as used herein, refers to an electronic device that has a processing resource, which is capable of executing machine-readable instructions (e.g., "software"). As examples, a computer platform may be a server computer (e.g., a blade server, a rack server or a standalone server), a desktop computer, a notebook computer, a tablet computer, a smartphone, a storage array, a network switch, a wearable computer, a network gateway, an Internet of Things (IoT) device, or another electronic device that has a processing resource.

The network fabric 104 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

In accordance with example implementations, the network fabric 104 includes one or multiple network appliances 110. As a more specific example, in accordance with some implementations, the network appliance 110 may control the connectivity of the branch LAN 172 with the remainder of the network 100 (e.g., controls the connectivity of the branch LAN 172 with a WAN).

In accordance with example implementations, the network appliance 110 may be affiliated with one or multiple physical, or actual, computer platforms. In this context, the computer platform has actual, or physical hardware components, such as one or multiple physical processors 121 (e.g., one or multiple central processing unit (CPU processing cores, one or multiple CPU semiconductor packages, or "sockets," one or multiple graphics processing unit (GPU) cores, one or multiple GPU semiconductor packages, and so forth) and memory devices that form a system memory 124. In an example, the network appliance 110 may be a logical abstraction of the computer platform(s) that host the network appliance 110. In an example, the network appliance 110 may be a software-defined appliance, such as, for example, a software-defined gateway.

The endpoint devices 170 may communicate with the servers 140 and other network resources 150 via network traffic flows. As depicted in FIG. 1, a given network traffic flow may include network traffic flow data 125 that directly or indirectly represent characteristics 127 that are associated with the network traffic flow. The characteristics 127 may include one or multiple inline parameters that are part of the network traffic flow, such as, a destination IP address contained in a packet header or an application ID contained in a packet payload. The characteristics 127 may include data that is not an inline parameter, such as, for example, a user ID that is not part of the data 125 but nevertheless associated with the network traffic flow.

In accordance with example implementations, a network traffic analysis engine 114 of the network appliance 110 observes the characteristics 127 that are associated with a given network traffic flow for purposes of identifying one or multiple observed profiles 119 that characterize the network traffic flow. The observed profiles 119 correspond to candidate profiles that are grouped by, or contained in, one or multiple T3 buckets 118. Each T3 bucket 118 has an associated perception score 117, and therefore, the network traffic analysis engine 114, by identifying a corresponding candidate profile for a given observed profile 119, also associates (and determines) a perception score 117 that is associated with the observed profile 119. Based on the perception scores 117 and a weighting applied to the perception scores 117 (as determined by an environment context 123), the traffic analysis engine 114 generates a policy score 131 for the network traffic flow. The policy score 131, in turn, controls a policy that is applied by the network appliance 110 to the network traffic flow.

As an example, in accordance with some implementations, the policy may be a packet inspection policy that is applied by the network appliance 110. For example, in accordance with some implementations, the network appliance 110 may include multiple policy enforcement engines 120, where each enforcement engine 120 is associated with a different degree of packet inspection. In this manner, in accordance with some implementations, a particular policy enforcement engine 120 may correspond to a relatively strict packet inspection policy, and as such, the enforcement engine 120 may, for example, apply a relatively strict packet inspection (e.g., an SSL inspection, a data loss prevention inspection and an anti-malware inspection). Another enforcement engine 120 may, for example, apply a relatively moderate packet inspection, such as, for example, an SSL inspection and an anti-malware inspection (but no DLP inspection). As another example, another enforcement engine 120 may apply a relatively lenient packet inspection, such as an SSL inspection (but no DLP inspection or anti-malware inspection).

In accordance with example implementations, the traffic analysis engine 114 selects the particular packet inspection policy based on a policy score 131. Moreover, in accordance with some implementations, the packet inspection policy may correspond to no packet inspection being applied to the network traffic flow.

In accordance with some implementations, a given T3 bucket 118 contains candidate profiles that are associated with a certain perception score 117. Stated differently, all of the members of a given T3 bucket 118, in accordance with example implementations, share the same perception, or perception score 117, in common. In accordance with example implementations, the network appliance 110 may be configured (e.g., configured by a system administrator) to set the number of T3 buckets 118, associate perception scores 117 with the T3 buckets 118 and populate the T3 buckets 118 with candidate profiles.

In accordance with example implementations, a T3 bucket 118 has two principal characteristics: containment and sufficiency. Containment is satisfied when a T3 bucket 118 contains an empty or a non-empty set of candidate profiles, and a set of one or more traffic perceptions (e.g., environment context 123 to derive weighted perception scores 117. In accordance with example implementations, the network analysis engine 114 may mathematically combine (e.g., sum) the weighted perception scores 117 to derive the policy score.

As a more specific example, in accordance with some implementations, the traffic analysis engine 114 may determine a policy score based on client role profile, application profile, network profile, network device profile and data profile role as follows:

$$
\begin{aligned}
\text{policy score} = \qquad\qquad\qquad\qquad\qquad\qquad\qquad\qquad\qquad\qquad\text{Eq. 1}\\
\big[\text{client role profile component: (client role profile perception score} * \text{client role profile weight)} +\\
\text{application profile component: (application profile perception score} * \text{application profile weight)} +\\
\text{network profile component: (network profile perception score} * \text{network profile weight)} +\\
\text{device profile component: (device profile perception score} * \text{device profile weight)} +\\
\text{data profile component: (data profile perception score} * \text{data profile weight)}\big]/100,
\end{aligned}
$$

traffic perception scores 117). Sufficiency is satisfied for a T3 bucket 118, and correspondingly, the T3 bucket 118 is valid when the T3 bucket 118 contains at least one non-empty set of candidate profiles and at least one network traffic flow perception (e.g., perception score).

In accordance with example implementations, the traffic analysis engine 114 identifies one or multiple observed profiles 119 for a given network traffic flow and checks the T3 buckets 118 for purposes of determining which T3 bucket(s) 118 contain the corresponding candidate profile(s). By associating the observed profiles 119 with respective T3 buckets 118, the network analysis engine 114 may then associate perception scores 117 with respective observed profiles.

The number of T3 buckets 118 may be configured for purposes of establishing a particular granularity for a particular environment context 123. For example, the number of T3 buckets 118 may be larger in number for a relatively smaller perception score 117 granularity or may be smaller in number for a relatively larger perception score 117 granularity.

In accordance with some implementations, depending on the particular use case, a given T3 bucket 118 may be associated with multiple perception scores 117. For example, the candidate profiles in a T3 bucket 118 may, for example, be associated with a perception score 117 of "6" for a certain environment context 123 and may be associated with a perception score 117 of "3" for a different environment context 123. Continuing this example, a single environment context 123 may be active at one time, and the perception score 117 affiliation of the T3 bucket 118 may depend on the particular active environment context 123.

For the following discussion, it may be assumed that the candidate profiles and the observed profiles 119 may be grouped into the following profile categories: client role, application, data, network and network device (or "device"). A given T3 bucket 118 may contain one or multiple candidate profiles associated with one or multiple of these categories, in accordance with example implementations. The traffic analysis engine 114, in accordance with example implementations, uses T3 bucket associations to calculate perception scores 117 for observed profiles 119 of the network traffic flow, and the traffic analysis engine 114 applies weights to the perception scores 117 according to the where "*" represents the multiplication operator. It is noted that a given network traffic flow may have observed profile(s) 119 corresponding to one or multiple of the client role, application, network, data and device profiles, and accordingly, for a given network traffic flow, one or multiple of the summed components of Eq. 1 may be zero.

As described further herein, in accordance with some implementations, the traffic analysis engine 114 may, responsive to determining the policy score, tag the network traffic flow with an identifier, or tag, which represents the particular policy to be applied to the network traffic flow. In an example, a tag may be associated with a packet (i.e., the network analysis engine 114 may embed the packet with the tag or wrap the packet with the tag) for purposes of tying the packet to a particular policy. In accordance with example implementations, the enforcement engines 120 respond to the tags such that for a given packet affiliation with a particular tag, a particular enforcement engine 120 corresponding to the tag performs the inspection(s) on the packet.

As used herein, an "engine," such as the traffic analysis engine 114, a deep packet inspection engine 133, a packet header inspection engine 131 and/or the enforcement engine 120, can refer to one or multiple circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. For the particular example implementation that is depicted in FIG. 1, the network appliance 110 includes one or multiple processors 121 and a memory 124 that stores machine-readable instructions 128 that, when executed by the processor(s) 121, cause the processor(s) 121 to perform one or multiple functions for the traffic analysis engine 114 and/or enforcement engine 120, as described herein. Alternatively, an "engine," in accordance with further implementations, such as the traffic analysis engine 114, the deep packet inspection engine 133, the packet header inspection engine 131 and/or the enforcement engine 120, in accordance with further implementations, may be solely hardware processing circuits that do not execute machine-readable instructions or a combination of one or multiple hardware processing circuits and circuits that execute machine-readable instructions.

In accordance with example implementations, the memory 124 may be implemented using a collection of physical memory devices. In general, the memory devices that form the memory 124, as well as other memories and storage media that are described herein, are examples of non-transitory machine-readable storage media. In accordance with example implementations, the machine-readable storage media may be used for a variety of storage-related and computing-related functions of the network appliance 110. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

Among its other features, in accordance with some implementations, the network appliance 110 may include a deep packet inspection engine 129 for purposes of extracting information from the network traffic flow for purposes of developing a particular profile 119. In this context, "deep packet inspection" refers to examining the content (e.g., payload data) of a packet other than the packet header. In accordance with some implementations, a particular profile (e.g., a network profile 119 derived from the destination IP address) may be derived from the packet header. Moreover, in accordance with example implementations, the network appliance 110 may include a packet header inspection engine 131 for purposes of extracting information from packet headers of network traffic flows.

Figure 2:
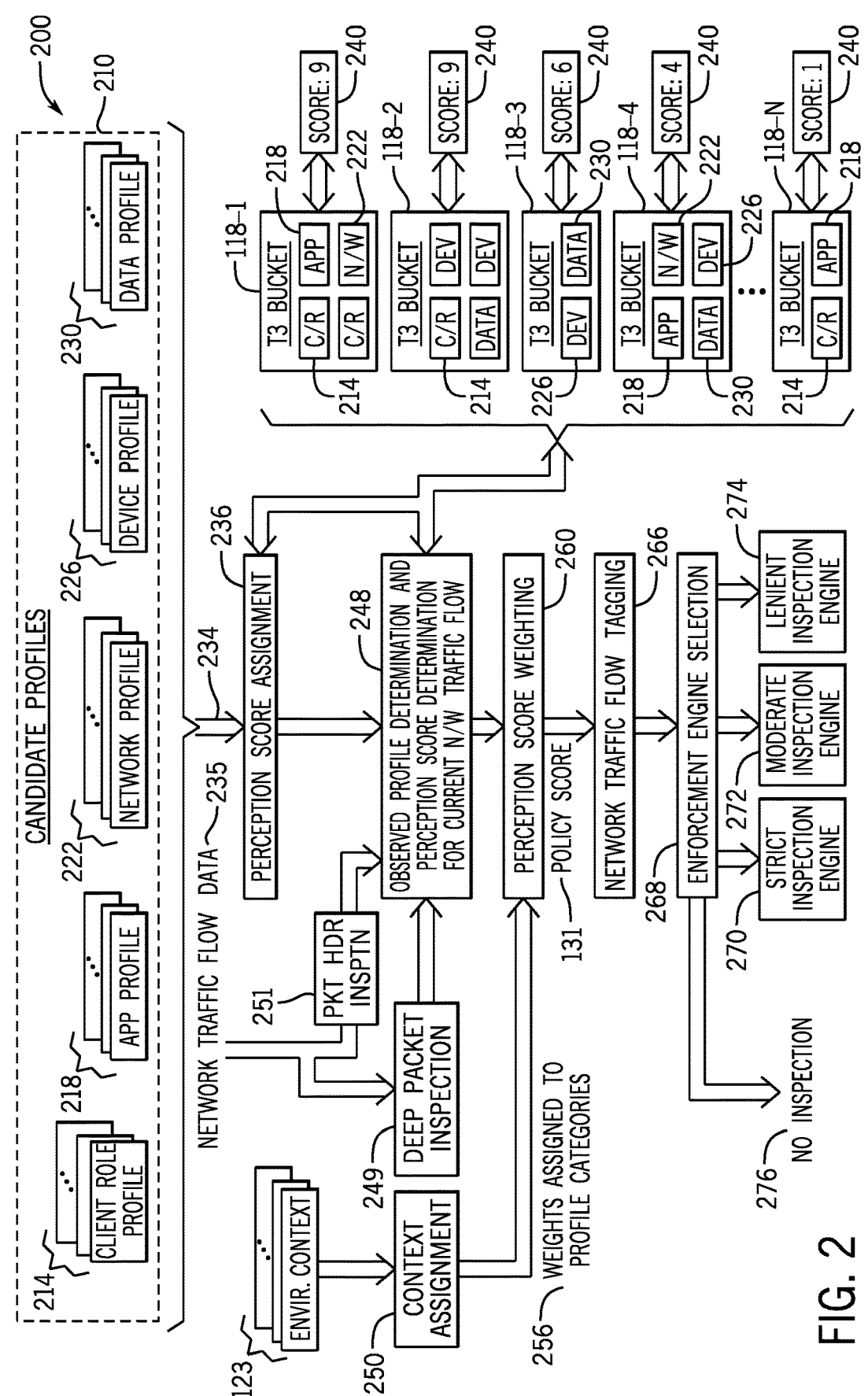
FIG. 2 is a flow diagram depicting a process to select a packet inspection policy for a network traffic flow according to an example implementation.

FIG. 2 depicts a process 200 to configure a network appliance (e.g., the network appliance 110 of FIG. 1) and use the configured network appliance to select packet inspection policies for network traffic flows, according to an example implementation. Referring to FIG. 2, the configuration of the network appliance includes configuring the network appliance with a set of candidate profiles 210 (as depicted at 234) and assigning (as depicted at 236) perception scores to the candidate profiles 210. In accordance with example implementations, the configuration of the network appliance may be achieved using a web-based portal or other interface (e.g., a web portal to set up a software-defined gateway).

For the specific example implementation depicted in FIG. 2, the candidate profiles 200 includes client role profiles 214, application profiles 218, network profiles 222, device profiles 226 and data profiles 230. Each of the candidate profiles 210, in turn, has an associated perception score, which is set during the configuration of the network appliance.

More specifically, as depicted in FIG. 2, there may be N T3 buckets 118 (T3 buckets 118-1, 118-2, 118-3, 118-4 and 118-N being depicted in FIG. 2). In an example, the T3 bucket 118-1 may contain candidate profiles that have an associated score 240 of "9." As shown, the candidate profiles within the T3 bucket 118-1 may correspond to different profile categories, such as, for this example, the client role, application, and network profiles. In this example, the particular T3 bucket 118-1 has multiple candidate client role profiles 214 and a network profile 222 but no candidate device profile 226 or candidate data profile 230. As another example, the T3 bucket 118-3 is associated with a perception score 240 of "6" and has candidate device 226 and data 230 profiles, but no candidate client role profile 214, candidate application profile 218, or candidate network profile 222. Likewise, the other T3 buckets 118-2, 118-4 and 118-N that are depicted in FIG. 2 may be associated with other perception scores 240 and contain other candidate profiles associated with similar and/or different profile categories. It is noted that, depending on the particular application, there may be multiple T3 buckets 118 that are associated with the same perception score 240, such as, for the example depicted in FIG. 2, T3 buckets 118-1 and 118-2 that are each associated with a perception score 240 of "9."

In accordance with example implementations, the network appliance performs, for a given network traffic flow, a profile determination and perception score determination, as depicted at 248. In this manner, the network appliance receives network traffic flow data 235 associated with a particular network traffic flow. Through packet inspection (e.g., packet header inspection 251 and/or deep packet inspection 249) and other information (e.g., user ID or profile information or other information downloaded into the network appliance) the network appliance may identify one or multiple observed profiles that are associated with the traffic flow. Using the T3 buckets 118, the network appliance may then associate each observed profile with a corresponding T3 bucket 118 and therefore, through this association, identify a perception score 240 for the observed profile.

Next, as depicted at 260, the network appliance may perform perception score weighting to provide a policy score 131. For this purpose, a context assignment 250 may provide the weights assigned to the profile categories based on a particular selected environment context 123. Next, the network appliance may perform network tagging, as depicted at 266, to assign a tag to the network traffic flow for purposes of signaling one or multiple other downstream devices of the network appliance to the particular policy that is to be applied to the network traffic flow.

For the example implementation depicted in FIG. 2, the enforcement engine may be a particular ruleset that is applied for purposes of packet inspection. FIG. 2 depicts a specific example in which the policy selects a type of packet inspection, and accordingly, the tagging allows a packet inspection engine to be selected, as depicted at 268. Moreover, as also depicted in FIG. 2, the engine selection may include selecting either a strict packet inspection engine 270, a moderate packet inspection engine 272, a lenient packet inspection engine 274 or, as depicted at 276, no inspection.

As the enforcement engines are described herein as being part of the same network appliance as the traffic analysis engine, in accordance with further implementations, the enforcement engines may be part of one or multiple network components other than a network component that contains the traffic analysis engine.

In accordance with some implementations, the enforcement engine selection 268 may allow an override. In this manner, via a configuration option (e.g., an option selected by an authorized user, such as a system administrator), the network appliance may be configured to enforce a particular policy (e.g., select a specific enforcement engine or bypass all packet inspection), regardless of the policy score.

Figure 3:
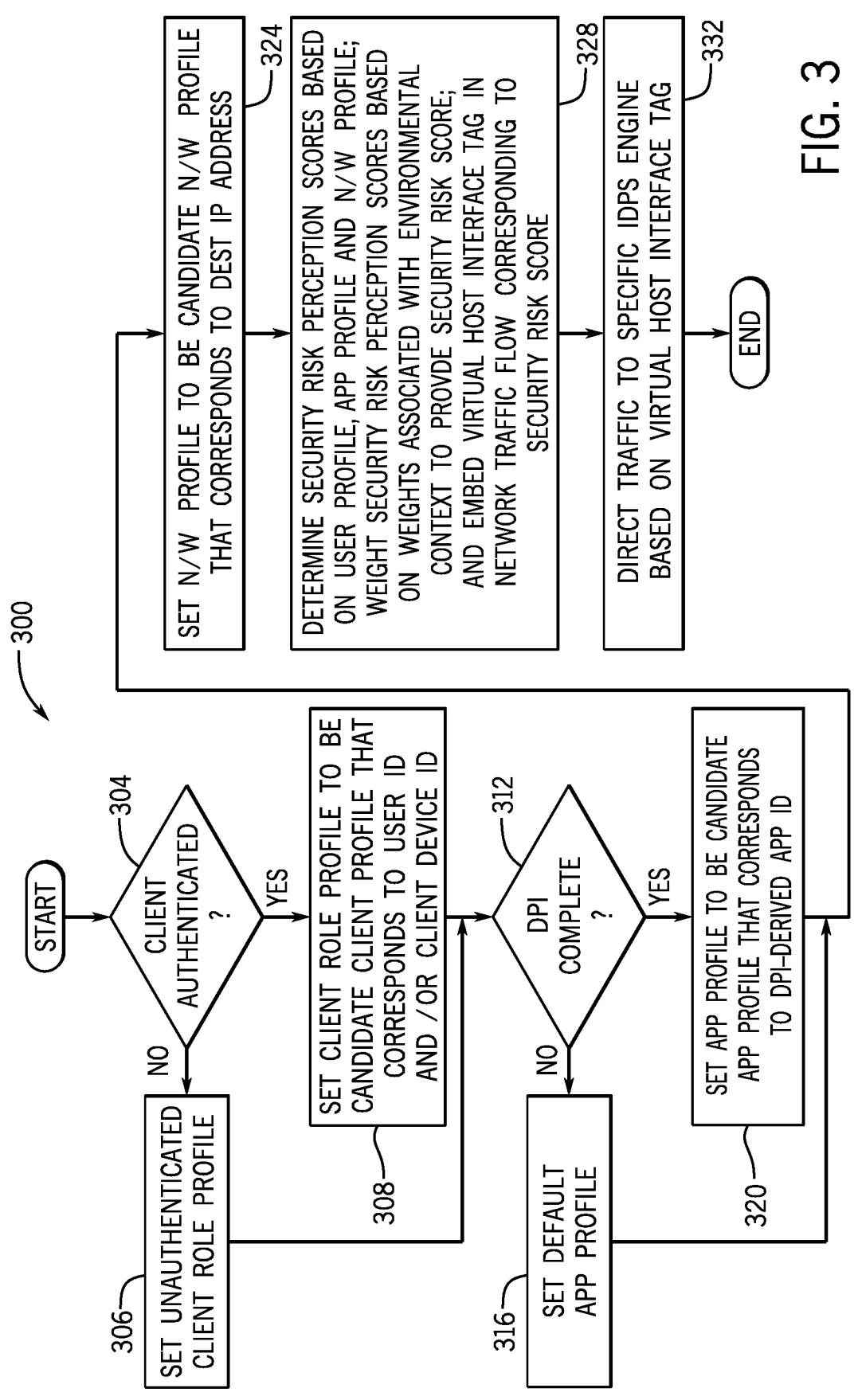
FIG. 3 is a flow diagram depicting a process to determine client role, application and network profiles of a network traffic flow and select an intrusion and detection prevention engine to process the network traffic flow based on a policy score that is derived from the profiles, according to an example implementation.

In accordance with an example implementation, FIG. 3 depicts a process 300 to select an intrusion and detection prevention engine to process a network traffic flow based on a policy score that is derived from profiles of the network traffic flow. Although the particular example implementation that is depicted in FIG. 3 relates to network security, in general, a policy score may be determined for a given network traffic flow and used to select network traffic decision-making policies (e.g., quality of experience policies or routing policies) other than security-related policies, in accordance with further implementations.

Referring to FIG. 3, in accordance with some implementations, a network appliance (e.g., the network appliance 110 of FIG. 1) may perform a process 300. In accordance with example implementations, the process 300 relies on profiles (called "downloaded" profiles below) that correlate different characteristics (e.g., user IDs, client device IDs, and application IDs) to candidate profiles.

The process 300 includes the network appliance determining (decision block 304) whether the client has been authenticated (e.g., authenticated based on a client device ID, a user ID or a combination thereof). If not, then, pursuant to block 306, the process 300 includes the network appliance setting an unauthenticated client role profile. Otherwise, pursuant to block 308, the network appliance selects a client role profile from other multiple candidate client role profiles (e.g., downloaded client role profiles) based on a user ID and/or a client ID that is associated with the network traffic flow. In this manner, because the client has been authenticated, the network appliance may have access to a user ID and/or a client ID. As examples, a user ID and/or a client ID may be provided to the network appliance via an access point or network access server.

Next, the process 300 includes the network appliance determining (decision block 312) whether a deep packet inspection of the network traffic flow has been completed. If not, then, pursuant to block 316, the network appliance sets a default application profile for the network traffic flow. Otherwise, if deep packet inspection has been completed, then, pursuant to block 320, the network appliance sets the application profile based on the deep packet inspection-derived application ID. In this manner, in accordance with example implementations, the network appliance may select a particular candidate application profile that corresponds to the application ID. In accordance with some implementations, the No prong of decision block 312 may be reached in response to a deep packet inspection of the traffic flow being unable to retrieve or determine an application ID.

The process 300 may next include the network appliance setting (block 324) the network profile based on a destination IP address that is associated with the network traffic flow. For example, the destination IP address may be derived from a packet header inspection, and the network appliance may use the destination IP to select a network profile among multiple candidate network profiles (e.g., candidate network profiles that are downloaded to the network appliance) based on the destination IP address. Next, in accordance with example implementations, the process 300 includes the network appliance determining, or computing, a policy score, pursuant to block 328. The determination of the policy score may include the network appliance using T3 bucket association to determine perception scores for the user profile, network profile and application profile; weighting the perception scores in accordance with a particular environment context; and adding the weighted perception scores together to provide the policy score. Based on the policy score, the network appliance may then determine an appropriate virtual local host tag and associate the virtual local host tag to the network traffic flow (e.g., embed the virtual local host tag in one or multiple packets or wrap one or multiple packets with the virtual local host tag) to direct the network traffic flow to the appropriate enforcement engine (an intrusion detection prevention system (IDPS) engine), pursuant to block 332.

Referring to FIG. 4, in accordance with example implementations, a process 400 includes prioritizing (block 404) candidate network flow profiles. The prioritization includes associating perception scores with respective candidate network traffic flow profiles. Each candidate network traffic flow profile is a member of a profile group of a plurality of profile groups. As examples, the profile groups may include one or multiple of a client role profile group, an application profile group, a data profile group, a network profile group, or a network device profile group. In accordance with example implementations, the candidate network traffic flow profiles may be defined as part of a configuration of a network appliance. In accordance with example implementations, the association of perception scores with the candidate network traffic flow profiles may be part of a configuration of a network appliance. In accordance with some implementations, the configuration may include creating traffic treatment type buckets, associating the traffic treatment buckets with respective perception scores and populating the traffic treatment buckets with candidate network traffic flow profiles.

The process 400 includes associating (block 408) weights with respective profile groups of the plurality of categories. In accordance with example implementations, the weights may correspond to a particular environment context for a network traffic flow. The weights may prioritize the perception scores so that some perception scores have more influence than others in the calculation of a policy score.

The process 400 includes, responsive to a network traffic flow, identifying (block 412), by a traffic analysis engine, a first observed profile of the network traffic flow corresponding to a first candidate network traffic flow profile. The process 400 includes, based on the perception score associated the first candidate network traffic flow profile and the weight associated with the profile group in which the first candidate network traffic flow profile is a member, determining (block 416) a policy score. In accordance with example implementations, determining the policy score includes multiplying the perception score by the associated weight and adding the corresponding weighted perception score with other perception scores.

The process 400 includes selecting (block 420), by the network analysis engine, a policy to be applied to the network traffic flow based on the policy score. In an example, the policy score may be a security threat risk score. In an example, the policy score may be a score used to assess whether an application throughput is of importance to the network traffic flow. In an example, the policy may be a policy pertaining to a particular ruleset to be applied to the network traffic flow. In an example, a policy may be a degree of packet inspection to be applied to the network traffic flow. In an example, the policy score may be subdivided into zones, with different zones being affiliated with different packet inspection policies (e.g., no packet inspection, a relatively lenient packet inspection policy, a relatively moderate packet inspection policy or a relatively strict packet inspection policy, as well as other packet inspection policies) for the network traffic flow.

Figure 5:
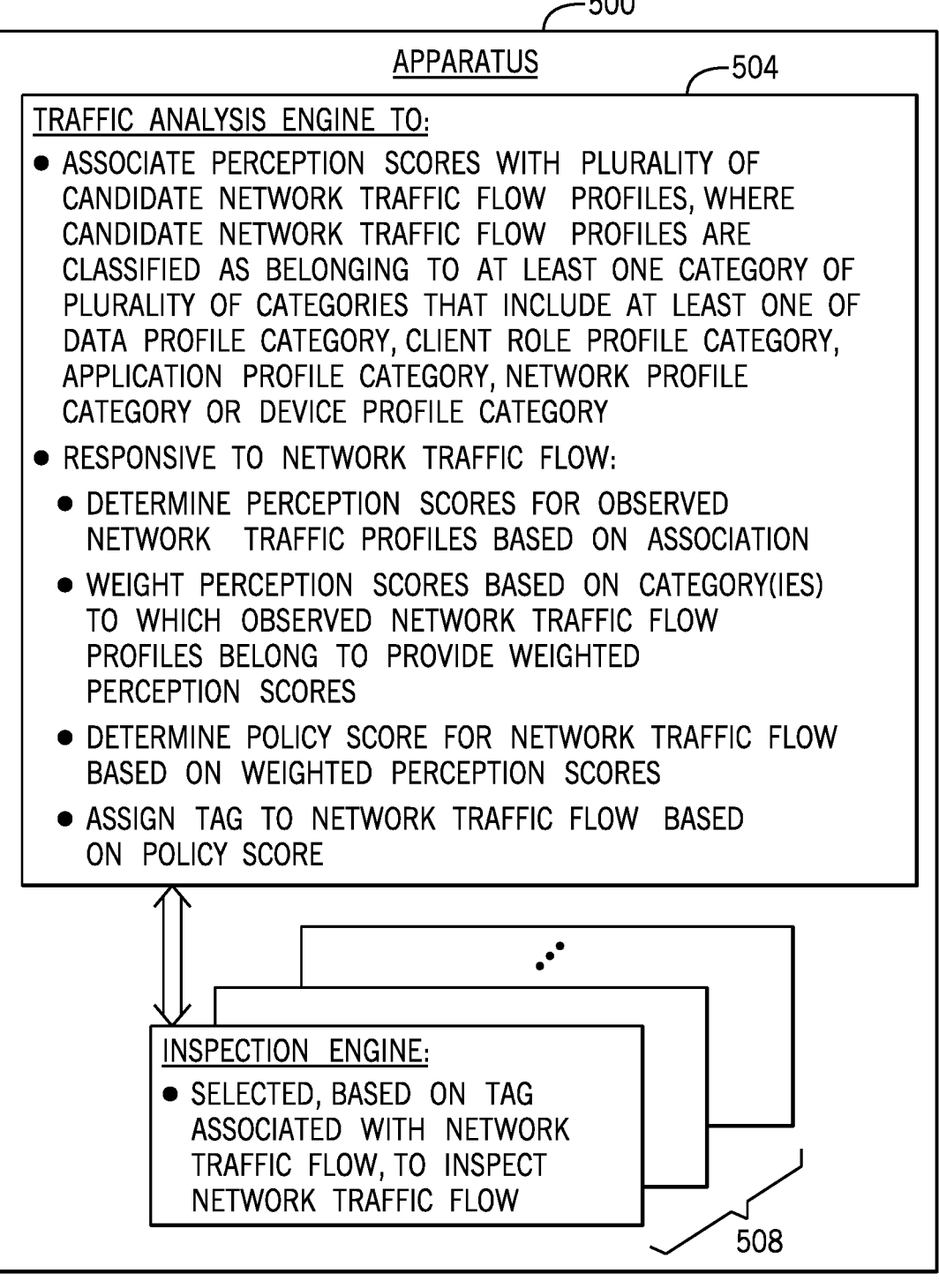
FIG. 5 is a block diagram of a network device that includes a traffic analysis engine to determine a policy score for a network traffic flow based on weighted perception scores for observed profiles of the network traffic flow according to an example implementation.

Referring to FIG. 5, in accordance with example implementations, an apparatus 500 includes a traffic analysis engine 504 and a plurality of inspection engines 508. In an example, the inspection engines 508 may be packet inspection engines. For example, in accordance with some implementations the packet inspection engines may include a first packet inspection engine that applies a relatively strict packet inspection policy using SSL inspection, anti-malware inspection and DLP inspection; a second packet inspection engine that applies a relatively more moderate packet inspection (as compared to the first packet inspection engine) using SSL inspection and anti-malware inspection but no DLP inspection; and a third packet inspection engine that applies a relatively more lenient packet inspection (as compared to the second packet inspection engine) that includes SSL inspection but anti-malware or DLP inspection. In an example, a particular enforcement engine may be associated with a particular ruleset that is applied to the content of a packet.

The traffic analysis engine 504 is to associate perception scores with a plurality of network session profiles. In an example, the perception scores may be integers (e.g., integers in the range of 1 to 10). The network session profiles are classified as belonging to at least one category of a plurality of categories, which include at least one of a data profile category, a user profile category, an application profile category, a network profile category, or a device profile category. The traffic analysis engine 504, responsive to a network session, determines perception scores for profiles of the network session based on the associations; and weights the perception scores based on the category (ies) to which the profiles of the network session belong to provide weighted perception scores. The weighting of the perception scores may include multiplying the perception scores by their associated weights. In an example, the policy may be generated by summing weighted perception scores together and diving the result by 100.

The traffic analysis engine 504, responsive to the network session, determines a policy for the network session based on the weighted perception scores; and assigns a tag to the network session based on the policy score. In an example, the tag may be a virtual host interface tag. In an example, assigning the tag may include embedding a tag in a packet of the network traffic flow or wrapping a packet with the tag.

In an example, the policy score range may be subdivided into ranges, or zones. The tags may be assign based on the zone that corresponds to the policy range. A given inspection engine 508 is selected to inspect the network traffic associated with the tag.

Referring to FIG. 6, in accordance with example implementations, a non-transitory machine-readable storage medium 600 stores machine-readable instructions 604 that, when executed by a machine, cause the machine to responsive to a network traffic flow, determine a profile that is associated with the network traffic flow based on network traffic that is associated with the network traffic flow. In an example, the determination of the profile may be based on one or multiple characteristics of the network traffic flow directly observable from the traffic flow data (e.g., a destination IP address contained in a packet header or an application ID contained in a packet payload). An example, a network profile for a network traffic flow may be determined based on a destination IP address. As another example, an application profile for a network traffic flow may be determined by selecting an application profile that has the same application ID. In another example, the determination of the profile may be based on one or multiple characteristics of the network traffic flow that are not directly observable from the traffic flow data. For example, the network traffic flow may be associated with a user ID (which is not part of the data), and the user ID may be used to identify or determine a client role profile for the network traffic flow.

The profile is associated with a profile category, and the profile category is associated with one of a user category, an application category or a network category. The instructions, when executed by the machine, further cause the machine to determine a risk score that is associated with the profile and determine a weight that is associated with the profile category. The weight may be based on a particular environment context. The instructions, when executed by the machine, further cause the machine to process the network traffic flow based on the risk score and first weight. In accordance with example implementations, the profile may be one of a set of candidate network traffic flow profiles that may be defined as part of a configuration of a network appliance. In accordance with some implementations, the configuration may include creating traffic treatment type buckets, associating the traffic treatment buckets with respective perception scores and populating the traffic treatment buckets with candidate network traffic flow profiles.

In accordance with example implementations, the perception score represents a security risk perception that is associated with the first network traffic flow profile. Selecting the policy includes selecting a type of inspection to be applied to the network traffic based on the policy score. A particular advantage is that the appropriate treatment of a network traffic flow may be selected using a policy score that is determined based on selection and objective criteria.

In accordance with example implementations, selecting the type of inspection includes, based on the policy score, selecting one of a first inspection applying secure sockets layer (SSL) inspection, anti-malware inspection and data loss prevention (DLP) inspection to the network traffic; a second inspection applying the SSL and the anti-malware inspection to the network traffic and foregoing the DLP inspection; or a third inspection applying the SSL inspection, foregoing the anti-malware inspection and foregoing the DLP inspection. A particular advantage is that the appropriate treatment of a network traffic flow may be selected using a policy score that is determined based on selection and objective criteria.

In accordance with some implementations, the perception score represents an application delivery perception that is associated with the network session profile. Selecting the policy includes selecting a routing of the network traffic based on the policy score. A particular advantage is that the appropriate treatment of a network traffic flow may be selected using a policy score that is determined based on selection and objective criteria.

In accordance with example implementations, the profile groups include at least one of a group associated with a client role, a group associated with an application type, a group associated with a network type, a group associated with a device type, and a group associated with a data type. A particular advantage is that the appropriate treatment of a network traffic flow may be selected using a policy score that is determined based on selection and objective criteria.

In accordance with some implementations, a tag is applied to the network traffic based on the policy score. The tag represents how the network traffic is to be processed. A particular advantage is that the appropriate treatment of a network traffic flow may be selected using a policy score that is determined based on selection and objective criteria.

In accordance with example implementations, the perception score represents a security risk perception that is associated with the network traffic flow profile. Applying the tag includes applying a tag to identify an inspection engine instance of a plurality of candidate inspection engine instances to the network traffic. A particular advantage is that the appropriate treatment of a network traffic flow may be selected using a policy score that is determined based on selection and objective criteria.

In accordance with example implementations, an indication of the policy is received and a determination is made whether the network traffic qualifies for a policy override. A determination is made whether to bypass the policy based on the determination of whether the network traffic qualifies for the policy override. A particular advantage is that the appropriate treatment of a network traffic flow may be selected using a policy score that is determined based on selection and objective criteria.

In accordance with some implementations, responsive to the network traffic flow, the network analysis engine identifies a second observed profile of the network traffic flow corresponding to a second network traffic flow profile other than the first network traffic flow profile. The policy score is determined based on the perception score associated with the second network traffic flow profile and the weight associated with the category in which the second network traffic flow profile is a member. A particular advantage is that the appropriate treatment of a network traffic flow may be selected using a policy score that is determined based on selection and objective criteria.

In accordance with some implementations, the category in which the network traffic flow profile is a member is the same as the category in which the first network traffic flow profile is a member. A particular advantage is that the appropriate treatment of a network traffic flow may be selected using a policy score that is determined based on selection and objective criteria.

In accordance with some implementations, the category in which the second network traffic flow profile is a member is other than the category in which the first network traffic flow profile is a member. A particular advantage is that the appropriate treatment of a network traffic flow may be selected using a policy score that is determined based on selection and objective criteria.

In accordance with example implementations, the network traffic flow is a network session. A particular advantage is that the appropriate treatment of a network traffic flow may be selected using a policy score that is determined based on selection and objective criteria.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

prioritizing a plurality of candidate network traffic flow profiles, wherein the prioritizing includes associating perception scores with respective candidate network traffic flow profiles of the plurality of candidate network traffic flow profiles, wherein each candidate network traffic flow profile of the plurality of candidate network traffic flow profiles is a member of a profile group of a plurality of profile groups;

associating weights with respective profile groups of a plurality of categories;

responsive to a network traffic flow, identifying, by a traffic analysis engine, a first observed profile of the network traffic flow corresponding to a first candidate network traffic flow profile of the plurality of candidate network traffic flow profiles;

based on the perception score associated with the first candidate network traffic flow profile and the weight associated with the profile group in which the first candidate network traffic flow profile is a member, determining a policy score; and selecting, by the traffic analysis engine, a policy to be applied to the network traffic flow based on the policy score.

2. The method of claim 1, wherein:

the perception score represents a security risk perception associated with the first network traffic flow profile; and selecting the policy comprises selecting a type of inspection to be applied to the network traffic flow based on the policy score.

3. The method of claim 2, wherein the selecting the type of inspection comprises, based on the policy score, selecting one of:

a first inspection applying secure sockets layer (SSL) inspection, anti-malware inspection and data loss prevention (DLP) inspection to the network traffic flow;

a second inspection applying the SSL and the anti-malware inspection to the network traffic flow and foregoing the DLP inspection; or a third inspection applying the SSL inspection, foregoing the anti-malware inspection and foregoing the DLP inspection.

4. The method of claim 1, wherein:

the perception score represents an application delivery perception associated with the first network traffic flow profile; and selecting the policy comprises selecting a routing of the network traffic flow based on the policy score.

5. The method of claim 1, wherein the plurality of profile groups comprises at least one of a group associated with a client role, a group associated with an application, a group associated with a network, a group associated with a device and a group associated with a data.

6. The method of claim 1, further comprising, based on the policy score, applying a tag to the network traffic flow representing how the network traffic flow is to be processed.

7. The method of claim 6, wherein:

the perception score represents a security risk perception associated with the first network traffic flow profile; and applying the tag comprises applying a tag to identify an inspection engine instance of a plurality of candidate inspection engine instances to the network traffic flow.

8. The method of claim 1, further comprising:

receiving an indication of the policy;

determining whether the network traffic flow qualifies for a policy override; and determining to bypass the policy based on the determination of whether the network traffic flow qualifies for the policy override.

9. The method of claim 1, further comprising:

responsive to the network traffic flow, identifying, by the traffic analysis engine, a second observed profile of the network traffic flow corresponding to a second network traffic flow profile of the plurality of network traffic flow profiles other than the first network traffic flow profile; and determining the policy score based on the perception score associated with the second network traffic flow profile and the weight associated with a category of the plurality of categories in which the second network traffic flow profile is a member.

10. The method of claim 9, wherein the category in which the second network traffic flow profile is a member is the same as the category in which the first network traffic flow profile is a member.

11. The method of claim 9, wherein the category in which the second network traffic flow profile is a member is other than the category in which the first network traffic flow profile is a member.

12. The method of claim 1, wherein the network traffic flow comprises a session.

13. An apparatus comprising:

one or more processors configured to execute one or more machine-readable instructions to:

associate perception scores with a plurality of network session profiles, wherein the network session profiles of the plurality of network session profiles are classified as belonging to at least one category of a plurality of categories comprising at least one of a data profile category, a user profile category, an application profile category, a network profile category or a device profile category; and responsive to a network session:

determine perception scores for profiles of the network session based on the association;

weight the perception scores based on the category or categories to which an observed network traffic flow profiles belong to provide weighted perception scores;

determine a policy score for the network session based on the weighted perception scores;

assign a tag to the network session based on the policy score; and inspect a network traffic flow associated with the tag.

14. The apparatus of claim 13, wherein the one or more processors are configured to execute the one or more machine-readable instructions to determine a given perception score of a given profile of the profiles of the network session by identifying the given network session profile of a given traffic treatment type bucket with the given profile wherein each traffic treatment bucket is associated with a perception score of the perception scores, and the given traffic treatment bucket of a plurality of traffic treatment buckets contains a given network session profile of the plurality of network session profiles.

15. A non-transitory machine-readable storage medium that stores machine-readable instructions, that, when executed by a machine, cause the machine to:

responsive to a network session, determine a first profile associated with the network session based on network traffic associated with the network session, wherein the first profile is associated with a first profile category, and the first profile category is associated with one of a user category, an application category or a network category;

determine a first risk score associated with the first profile;

determine a first weight associated with the first profile category;

process the network traffic associated with the network session based on the first risk score and the first weight;

responsive to the network session, determine a second profile associated with the network session based on the network traffic, wherein the second profile is associated with a second profile category other than the first profile category, and the second profile category is associated with one of the user category, the application category or the network category;

determine a second risk score associated with the second profile;

determine a second weight associated with the second profile category; and determine a composite score based on the first risk score, the first weight, the second risk score and the second weight; and determine how to process the network traffic based on the composite score.

16. The storage medium of claim 15, wherein:

the first risk score represents a perceived security risk associated with the first profile; and the instructions, when executed by the machine, further cause the machine to select an inspection engine from a plurality of inspection engines to inspect the network traffic based on a score determined from the first weight and the first risk score.

17. The storage medium of claim 15, wherein:

the first profile comprises a network profile associated with the network category; and the instructions, when executed by the machine, further cause the machine to:

determine a destination address associated with the network traffic; and determine the network profile based on the destination address.

18. The storage medium of claim 15, wherein:

the first profile comprises an application profile associated with the application category; and the instructions, when executed by the machine, further cause the machine to:

responsive to determining that a deep packet inspection has been performed, associating the network traffic with an application identifier provided as a result of the deep packet inspection; and determine the application profile based on the application identifier.

* * * * *